(12) United States Patent
Ogasawara et al.

(10) Patent No.: US 6,678,232 B2
(45) Date of Patent: Jan. 13, 2004

(54) ABERRATION CORRECTING ELEMENT AND ASSEMBLY

(75) Inventors: Masakazu Ogasawara, Tsurugashima (JP); Yoshitsugu Araki, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 138 days.

(21) Appl. No.: 10/046,555

(22) Filed: Jan. 16, 2002

(65) Prior Publication Data

US 2002/0105889 A1 Aug. 8, 2002

(30) Foreign Application Priority Data

Feb. 7, 2001 (JP) .................................. 2001-030513

(51) Int. Cl.⁷ ................................................ G11B 7/00
(52) U.S. Cl. ................................................. 369/112.02
(58) Field of Search ....................... 369/112.02, 112.22, 369/112.01, 118, 44.23

(56) References Cited

U.S. PATENT DOCUMENTS

| 6,480,454 B1 | * | 11/2002 | Wada et al. | ........... | 369/112.02 |
| 6,532,202 B1 | * | 3/2003 | Wada et al. | ........... | 369/112.02 |
| 6,584,058 B1 | * | 6/2003 | Yoshikawa et al. | .... | 369/112.02 |

\* cited by examiner

Primary Examiner—Paul W. Huber
(74) Attorney, Agent, or Firm—McGinn & Gibb, PLLC

(57) ABSTRACT

An aberration correcting element includes a first electrode layer including a plurality of electrode portions; a second electrode layer opposed to the first electrode layer; and a liquid crystal sandwiched between the first and second electrode layers for producing a phase change corresponding to voltages applied to the first and second electrode layers in a light beam passing therethrough. The first electrode layer includes a plurality of position markers.

6 Claims, 7 Drawing Sheets

ABERRATION CORRECTING ELEMENT AND ASSEMBLY

BACKGROUND OF THE INVENTION

1. Field of the Invention

The present invention relates to an aberration correcting element and an aberration correcting assembly for correcting aberration of a light beam.

2. Description of the Related Art

Optical discs such as a CD (Compact Disc) and a DVD (Digital Video Disc or Digital Versatile Disc) are well known as information recording media for optically recording and reproducing information. Furthermore, there are various types of optical discs, for example, optical discs for reproduction only, write-once optical discs on which only additional recording can be done, and rewritable optical discs on which information can be erased and re-recorded.

Research and development are in progress for developing high-density optical discs and optical pickups and information recording and/or reproducing apparatuses (hereinafter referred to as recording/reproducing apparatus) applicable to the high-density optical discs. In addition, research and development have also been pursued for developing optical pickups and information recording/reproducing apparatuses having the capability to be used for optical discs of different types.

A method of using with the high-density discs by increasing a numerical aperture (NA) of an objective lens provided in the pickup apparatus has been considered. Another method is the use of a light beam having a shorter wavelength.

However, the aberration of the light beam caused by an optical disc is increased as the numerical aperture NA of the objective lens is increased or a light beam having a shorter wavelength is used. This makes it difficult to improve performance accuracy of the recording/reproduction of information.

For example, when an objective lens having a large numerical aperture is used, the amount of birefringence distribution, which depends on the incidence angle, is increased at the pupil surface of the optical disc, since the range of the incidence angle of the light beam to the optical disc is increased. This creates an aberration problem due to the birefringence becoming more influential. In addition, the effect of aberration produced by error in the thickness of a disc cover layer for protecting the disc recording surface increases.

One example of such an aberration correcting element is disclosed, for example, in Japanese Patent Application Kokai H10-269611. The aberration correcting element has a plurality of coaxial electrodes made of transparent material. The orientational ordering in a liquid crystal is adjusted by changing the voltage applied to each of the electrodes. Thus, the aberration produced in the light beam is corrected.

It is necessary to align the aberration correcting element precisely with the objective lens in order to correct the aberration accurately. Accordingly, in some cases, the aberration correcting element is previously aligned with the objective lens and fixed to the lens to form an integrated aberration correcting assembly. The aberration correcting element is aligned with the objective lens by adjusting relative positions while applying a voltage to the transparent electrodes of the aberration correcting element to produce diffraction and observing an image through the objective lens with an imaging device such as a CCD camera when manufacturing the aberration correcting assembly.

It is a problem in the above-described alignment method that the contrast of the transparent electrode pattern is unclear and, therefore, the alignment accuracy is low. Furthermore, it is difficult to ascertain the amount of positional deviation between the objective lens and the aberration correcting element when the positional deviation occurs.

OBJECT AND SUMMARY OF THE INVENTION

The present invention has been made to overcome the above-described problems, and it is an object of the present invention to provide an aberration correcting element capable of being accurately aligned with an optical element, as well as a high-performance aberration correcting assembly in which an optical element and an aberration correcting element are aligned with high accuracy.

To achieve the object, according to one aspect of the present invention, there is provided an aberration correcting element which includes a first electrode layer having a plurality of electrode portions, a second electrode layer opposed to the first electrode layer, and a liquid crystal sandwiched between the first and second electrode layers for producing a phase change corresponding to voltages applied to the first and second electrode layers in a light beam passing therethrough, wherein the first electrode layer includes a plurality of position markers.

According to another aspect of the present invention, there is provided an aberration correcting assembly, which comprises a first electrode layer including a plurality of electrode portions and first position markers; a second electrode layer opposed to the first electrode layer; a liquid crystal sandwiched between the first and second electrode layers for producing a phase change in a light beam passing therethrough corresponding to voltages applied to the first and second electrode layers; and an optical element including second position markers corresponding to the first position markers.

DETAILED DESCRIPTION OF THE PREFERRED EMBODIMENTS

Referring to the attached figures, the preferred embodiments of the present invention will be described in detail. In the figures used in the following description, substantially identical components are indicated by identical numerals.

Figure 1:
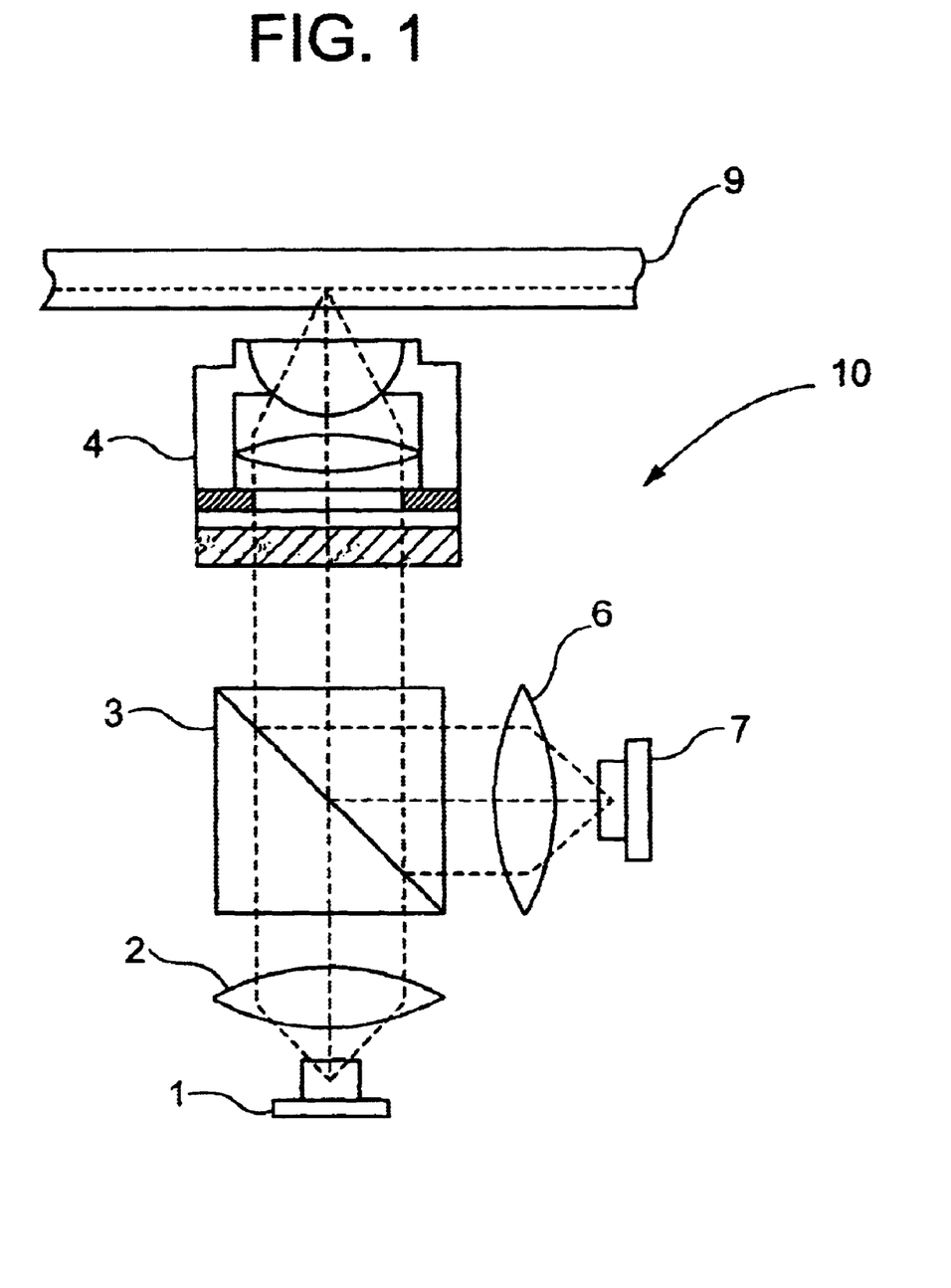
FIG. 1 is a block diagram showing the structure of an optical pickup having an aberration correcting assembly according to an embodiment of the present invention.

FIG. 1 is a block diagram showing the structure of an optical pickup 10 having an aberration correcting assembly 4 according to an embodiment of the present invention.

A light beam emitted from a laser light source 1 mounted in the optical pickup 10 is collimated by a collimating lens 2. The collimated light beam is made incident on an optical disc 9 via a polarization beam splitter 3 and the aberration correcting assembly 4. The incident light beam is reflected by the optical disc 9. The reflected light beam passes through the aberration correcting assembly 4. The light beam is, then, reflected by the beam splitter 3, collected by a collector lens 6, and detected by an optical detector 7.

Figure 2:
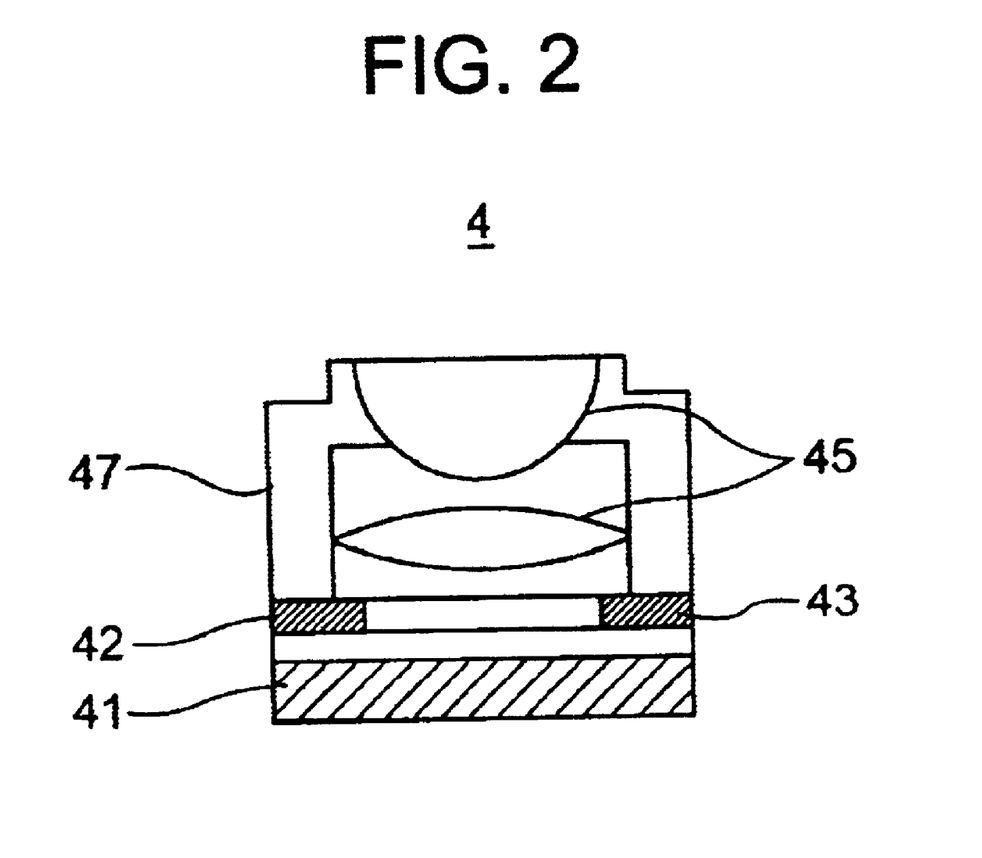
FIG. 2 is a cross-sectional view schematically showing the structure of the aberration correcting assembly.

The aberration correcting assembly 4 includes an aberration correcting element 41, a quarter wavelength plate 42, an aperture stop 43, and a high numerical aperture objective lens 45 comprising two lenses as shown in the cross-sectional view of FIG. 2. These optical elements are held stationary by a microscope column 47. As described in detail later, the aberration correcting element 41 and the high numerical aperture objective lens 45 are placed and fixed in position such that their optical axes are in alignment with each other.

The aberration correcting element 41 has an electro-optical device that shows an electro-optical effect when an electric field is applied thereto. The aberration correcting element 41 includes an optical element (e.g., a liquid crystal) that shows a variation in birefringence according to the magnitude of an applied control voltage Vi. More particularly, the aberration correcting element 41 includes a first electrode layer 17, a second electrode layer 18, and a liquid crystal 19 sealed in and sandwiched between the two electrode layers as schematically shown in the perspective view of FIG. 3. More specifically, a liquid crystal orientation film 21, a transparent insulating layer 23, and the first electrode layer 17 are successively formed on one surface of the liquid crystal 19. On the other surface, there are successively formed a liquid crystal orientation film 22, a transparent insulating layer 24, and the second electrode layer 18. Insulating substrates 15 and 16 such as transparent glass plates are formed on the first electrode layer 17 and the second electrode layer 18, respectively.

Figure 3:
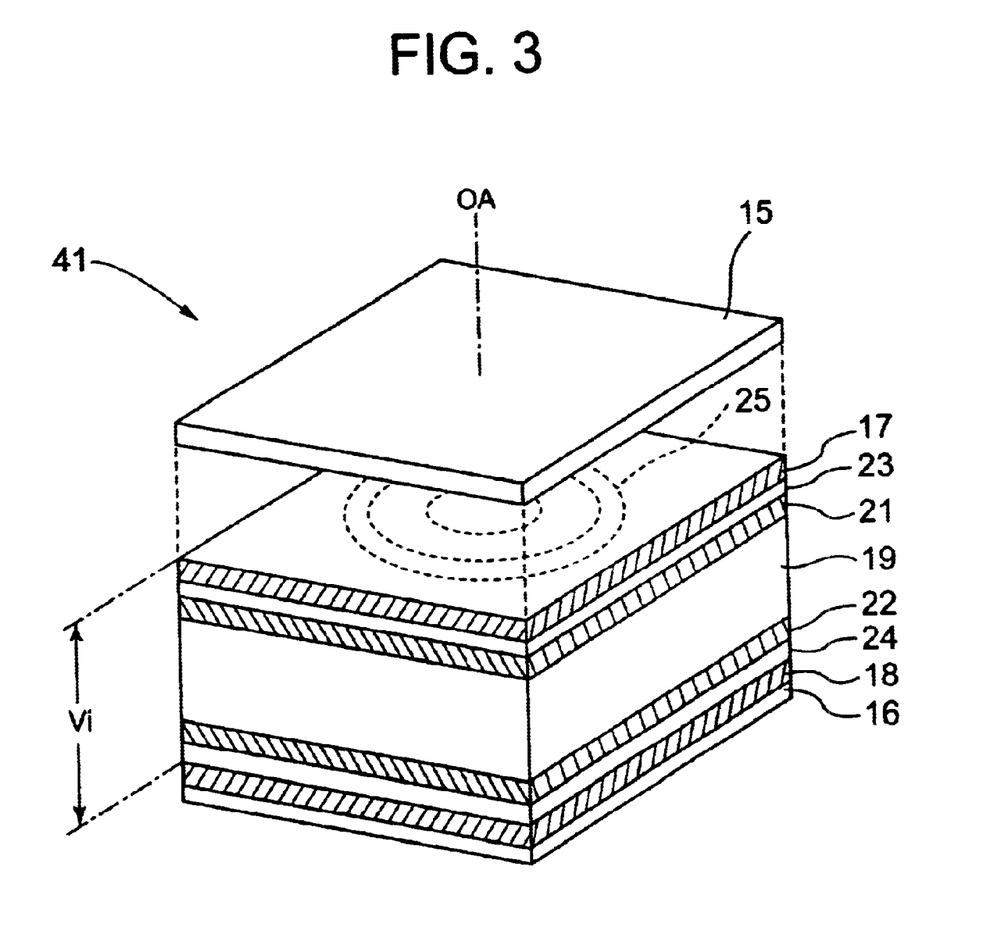
FIG. 3 is a perspective view schematically showing the structure of an aberration correcting element.

At least one of the first electrode layer 17 and the second electrode 18 has a plurality of electrode portions. The electrode pattern of the electrode portions corresponds to a plurality of phase-adjusting portions. Aberration in the light beam passing through the aberration correcting element 41 can be corrected by applying a voltage corresponding to the profile of the distribution of the aberration produced in the light beam to each of the electrode portions. In the embodiment described below, the first electrode layer 17 is configured to have a plurality of electrode portions.

Figure 4:
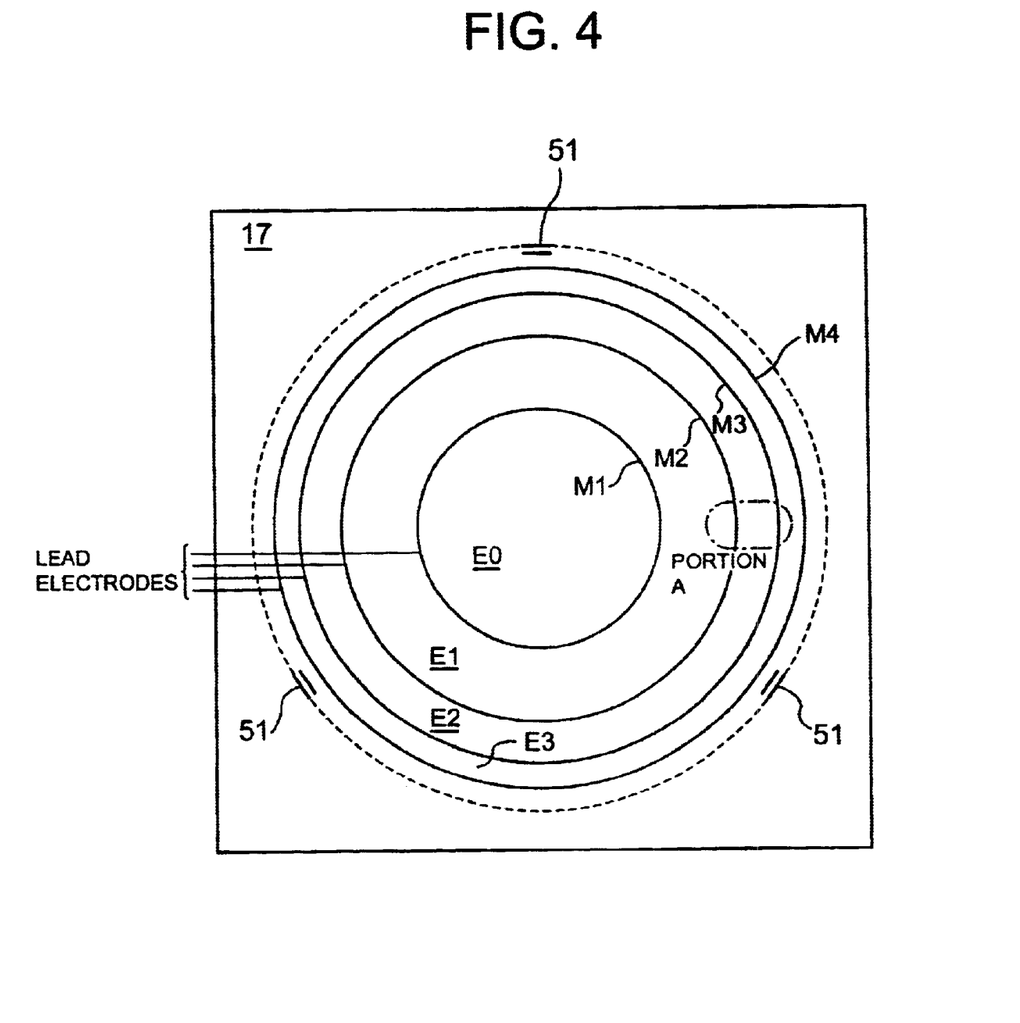
FIG. 4 is a plan view schematically showing the structure of a first electrode layer in an aberration correcting element for correcting spherical aberration.
Figure 5:
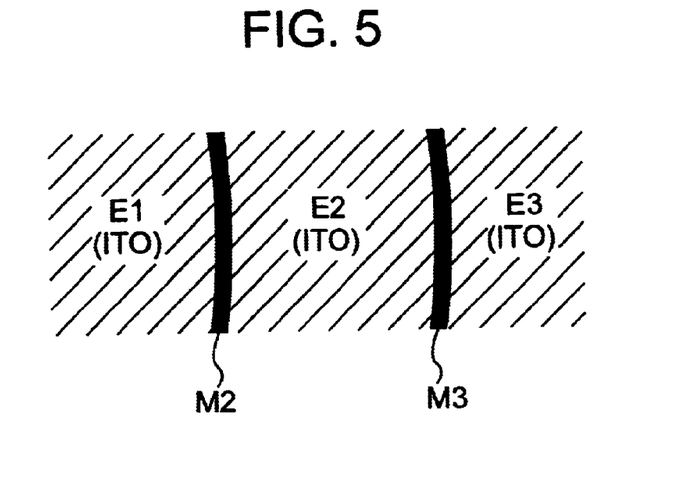
FIG. 5 is a enlarged view of portion A shown in FIG. 4.

The structure of the first electrode layer 17 of the aberration correcting element 41 for correcting spherical aberration is schematically shown in the plan view of FIG. 4. The first electrode layer 17 has a plurality of coaxial, annular phase adjusting portions corresponding to the distribution of the spherical aberration produced in the light beam from the optical disc 9. As shown in the enlarged view (portion A of FIG. 4) of FIG. 5, narrow and annular metal electrodes Mi (i=1, 2, . . . ) and transparent electrodes Ei (i=1, 2, . . . ) comprising a plurality of ITO (indium-tin oxide)films partitioned by the metal electrodes Mi are formed. The width of the metal electrodes Mi is set to several micrometers ($\mu$m), for example, to prevent the passing light beam from being affected. The metal electrodes Mi are connected to lead electrodes for applying voltages to the metal electrodes Mi. When control voltages Vi (i=1, 2, . . . ) are applied to the metal electrodes Mi via the lead electrodes, an electric field which varies gradually according to the resistivity of the ITO films is applied to the liquid crystal 19. Correspondingly, the orientation of liquid crystal molecules in the various portions of the liquid crystal 19 varies. The light passing through the liquid crystal 19 varies in phase by undergoing the birefringence of the liquid crystal 19. As a result, the phase of the light can be controlled by the control voltages Vi applied to the liquid crystal 19.

Three position markers 51 for alignment are formed at an outer periphery of the region of the aberration correcting element 41 corresponding to the aperture diameter (pupil diameter) of the objective lens 45. In the case shown in FIG. 4, the three position markers 51 are identical in shape and equally spaced from each other by 120 degrees, and are equidistant from the center of the optical axis. Positional deviation within a plane can be determined by providing the position markers 51 at three predetermined positions that are not on a straight line.

Figure 6:
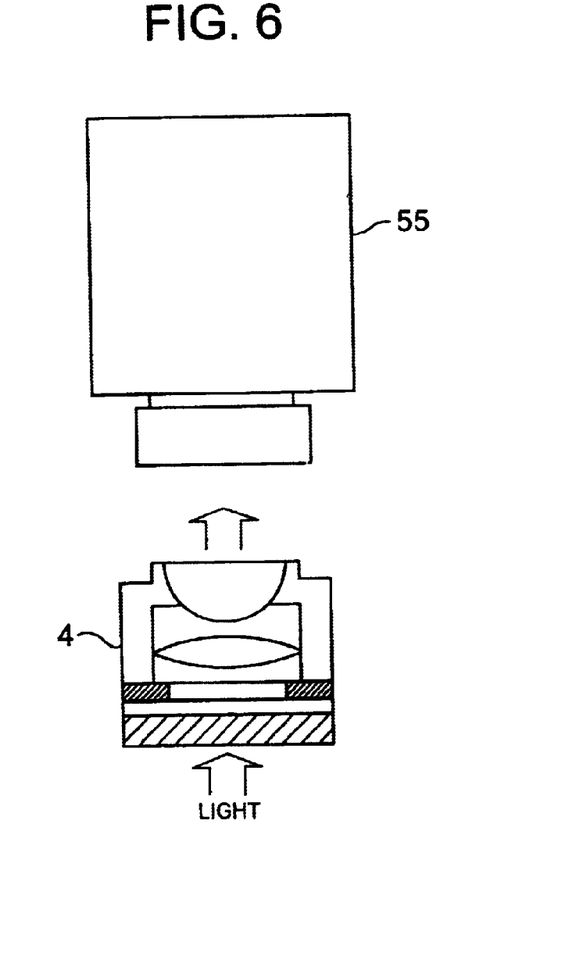
FIG. 6 is a view showing the arrangement of an aberration correcting element, an objective lens, and an observational camera when adjustment is performed.

FIG. 6 is a view showing the arrangement of the aberration correcting element 41, the objective lens 45, and a camera for observation (e.g., a CCD camera) when positioning or adjustment of the aberration correcting element 41 and the objective lens 45 is performed. Light from a light source for adjustment is passed through the aberration correcting element 41 and the objective lens 45. The relative position of the aberration correcting element 41 and the objective lens 45 is adjusted and fixed while observing the light passed therethrough with the CCD camera 55. The CCD camera 55 is connected to a control unit (not shown) such as a microcomputer for image processing or position adjustment.

Figure 7:
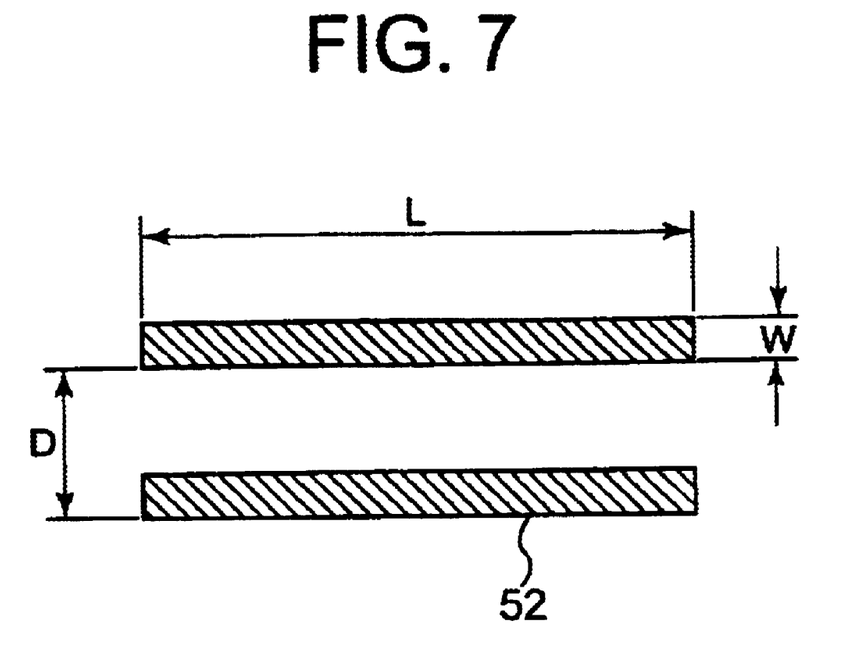
FIG. 7 is a view showing one example of position marker.

Each of the position markers 51 is shaped to have an array of strips 52 each having a length L and a width W as shown in FIG. 7. The distance D between the strips 52 is set to a desired value (e.g., 10 $\mu$m). In this way, the markers can be used as a scale for measuring the amount of positional deviation. Therefore, the amount of relative positional deviation between the aberration correcting element 41 and the objective lens 45 can be accurately measured.

Figure 8A:
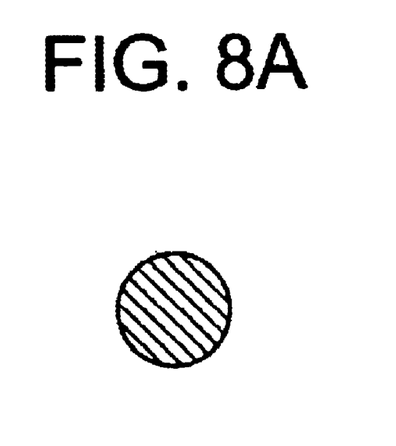
FIGS. 8A and 8B are views showing other examples of position marker.
Figure 8B:
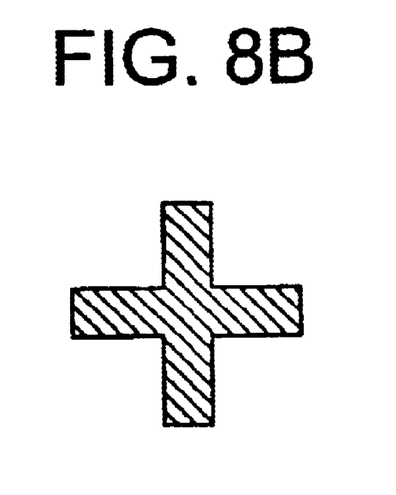

The manufacturing process can be simplified by forming the position markers 51 from the same material as the metal electrodes of the aberration correcting element 41. The position markers 51 are not always required to be identical in shape. For example, as shown in FIGS. 8A and 8B, a circular- or crisscross-shaped position marker can be formed in the center of the aberration correcting element 41, thus permitting accurate alignment with the center of the objective lens 45. The position markers 51 may be visually observable markers and can be made of various materials. Furthermore, various methods can be employed. For instance, the position markers may be printed on the metal electrodes of the aberration correcting element 41 using printing techniques.

Figure 9:
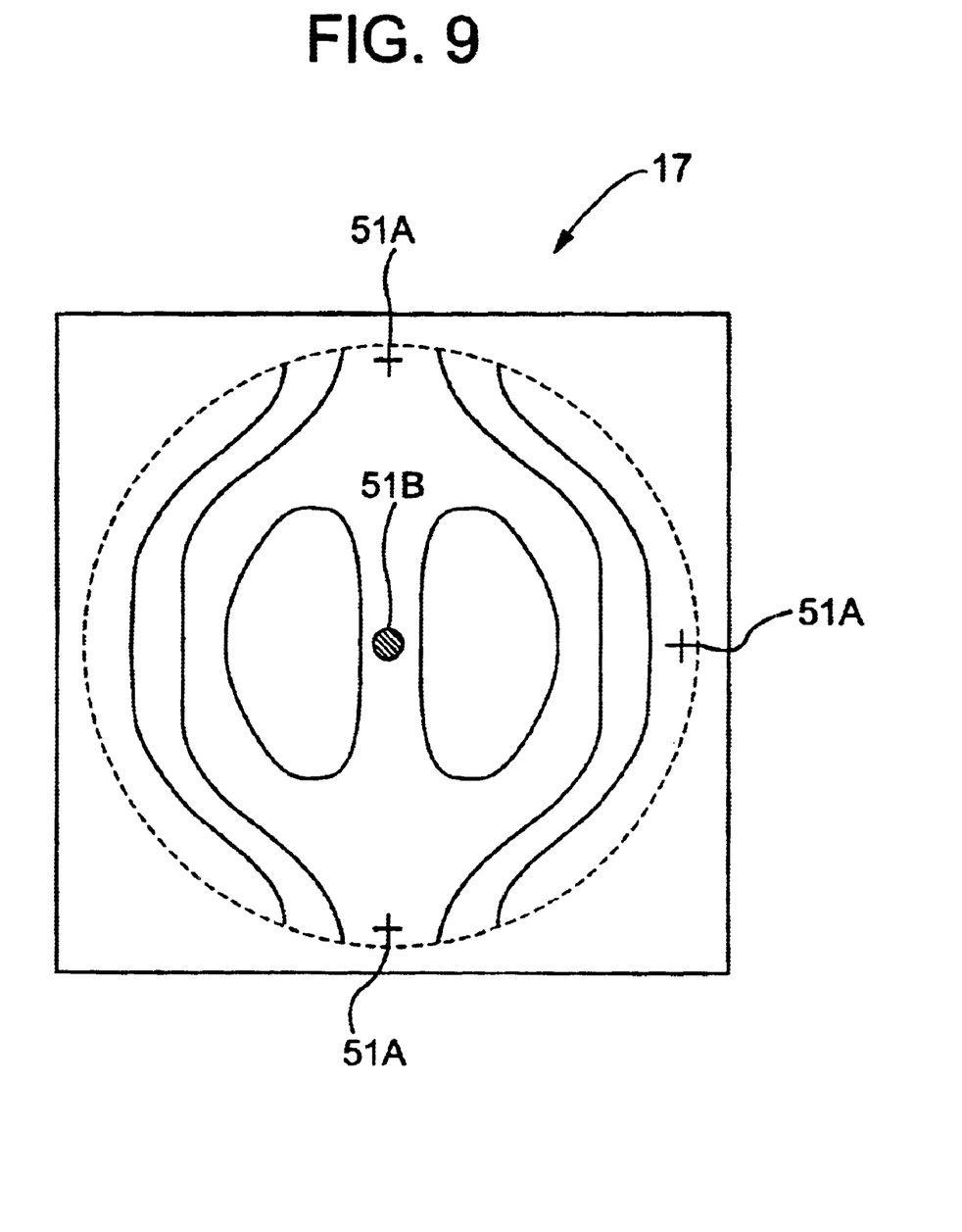
FIG. 9 is a plan view schematically showing the structure of an electrode layer of an aberration correcting element for correcting coma aberration.

In the description given above, the aberration correcting assembly 4 in which the aberration correcting element 41 for correcting spherical aberration and the objective lens 45 are connected together is given as an example. The invention can also be applied to the aberration correcting element 41 for correcting various aberrations such as coma aberration and astigmatism. For example, FIG. 9 is a plan view schematically showing the structure of the first electrode layer 17 of the aberration correcting element 41 for correcting coma aberration.

The first electrode layer 17 is formed in a pattern of electrodes corresponding to the distribution of coma aberration to be corrected. More particularly, the layer is symmetric with respect to the axis passing through the center point. Three perpendicular crisscross position markers 51A are formed at the outer periphery of the region of the aberration correcting element 41 corresponding to the aperture diameter of the objective lens 45. A position marker 51B is formed in the center. The diameter of the position marker 51B is determined so as not to affect the passing light, e.g., about 10 μm.

Accordingly, an aberration correcting element allowing accurate alignment can be provided by appropriately selecting the positions and shape of the position markers according to the shape of the pattern of electrodes of the aberration correcting element 41. Furthermore, complex image processing is not necessary during alignment. Consequently, accurate alignment with the optical element can be easily made.

While an aberration correcting device applied to an optical pickup for an optical disc or the like has been described as an example, the invention is not limited to this. The present invention can be applied to devices for correcting aberrations in various optical systems. In addition, it should be noted that the numerical values given in the above embodiments are merely exemplary. The above-described embodiments can be utilized with appropriate modifications or in combinations.

As apparent from the foregoing, the present invention provides an aberration correcting element capable of being accurately aligned with an optical element, as well as a high-performance aberration correcting assembly in which an optical element and an aberration correcting element are aligned with high accuracy.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2001-30513 which is hereby incorporated by reference.

What is claimed is:

1. An aberration correcting element, comprising:
    a first electrode layer including a plurality of electrode portions;
    a second electrode layer opposed to said first electrode layer; and
    a liquid crystal sandwiched between said first and second electrode layers for producing a phase change in a light beam passing therethrough corresponding to voltages applied to said first and second electrode layers,
    wherein said first electrode layer includes a plurality of position markers.

2. The aberration correcting element according to claim 1, wherein said position markers are formed in at least three predetermined positions that are not on a straight line.

3. The aberration correcting element according to claim 1, wherein said position markers are located close to an outer periphery of a region within which said light beam is adjusted in phase.

4. The aberration correcting element according to claim 1, wherein said plurality of electrode portions are made of metal, and wherein said position markers are made of a metal that is identical to the metal of said electrode portions.

5. An aberration correcting assembly, comprising:
    a first electrode layer including a plurality of electrode portions and first position markers;
    a second electrode layer opposed to said first electrode layer;
    a liquid crystal sandwiched between said first and second electrode layers for producing a phase change in a light beam passing therethrough corresponding to voltages applied to said first and second electrode layers; and
    an optical element including second position markers corresponding to said first position markers.

6. The aberration correcting assembly according to claim 5, wherein said first position markers are formed close to an outer periphery of a pupil of said optical element.

* * * * *